(12) United States Patent
Hou et al.

(10) Patent No.: US 7,835,144 B2
(45) Date of Patent: Nov. 16, 2010

(54) QUICK-ASSEMBLY COMPUTER PERIPHERAL

(75) Inventors: Ding-Teng Hou, Sanchung (TW); Huei-Jen Chang, Sanchung (TW)

(73) Assignee: Kye Systems Corp., Sanchung, Taipei Hsien (TW)

( * ) Notice: Subject to any disclaimer, the term of this patent is extended or adjusted under 35 U.S.C. 154(b) by 37 days.

(21) Appl. No.: 12/457,469

(22) Filed: Jun. 11, 2009

(65) Prior Publication Data

US 2009/0310289 A1 Dec. 17, 2009

(30) Foreign Application Priority Data

Jun. 12, 2008 (TW) .............................. 97121831 A

(51) Int. Cl.
*G06F 1/16* (2006.01)
(52) U.S. Cl. .................... 361/679.08; 29/428; 219/734; 439/440; 345/156; 248/73
(58) Field of Classification Search .............. 455/556.1, 455/296; 29/603.3, 428, 842; 361/679.02, 361/679.08, 679.31, 679.32, 679.44, 679.06, 361/679.55; 219/633, 603, 734; 360/264.2, 360/75; 439/581, 79, 440, 493; 345/163, 345/175, 158, 156, 99; 248/68.1, 73, 74.3
See application file for complete search history.

(56) References Cited

U.S. PATENT DOCUMENTS

| 2004/0074082 A1* | 4/2004 | Kim et al. ................ 29/603.03 |
| 2009/0104937 A1* | 4/2009 | Lapstun et al. ........... 455/556.1 |
| 2009/0198360 A1* | 8/2009 | Lapstun et al. ................ 700/94 |

* cited by examiner

*Primary Examiner*—Hung V Duong
(74) *Attorney, Agent, or Firm*—Bacon & Thomas, PLLC

(57) ABSTRACT

A quick-assembly computer peripheral has a bottom casing, a top casing, a vertical mounting device, an electronic assembly and a vertical positioning device. The vertical mounting device is mounted between the top and bottom casings and combining the top and bottom casings together along a vertical direction. The electronic assembly is mounted between the bottom and top casing and has a PCB and a cable assembly. The vertical positioning device mounted between the top and bottom casings and positioning the electronic assembly along the vertical direction. Because fabrication of the quick-assembly computer peripheral does not require fasteners, such as screws or rivets, fabrication is quick and easy.

10 Claims, 4 Drawing Sheets

QUICK-ASSEMBLY COMPUTER PERIPHERAL

BACKGROUND OF THE INVENTION

1. Field of the Invention

The present invention relates to a computer peripheral, and more particularly to a quick-assembly computer peripheral that has a bottom casing and a top casing quickly attached to the bottom casing to facilitate a semi-automated or fully-automated manufacturing process, thus lowering manufacturing costs and raising the production rate of the computer peripheral.

2. Description of Related Art

Computer peripherals comprise keyboards, mice, trackballs, pen tablets and the like. A conventional mouse has a bottom casing, a top casing, a printed circuit board (PCB) and a cable. The top and bottom casings are combined by screws and form an inner chamber. The PCB is mounted in the inner chamber and has multiple preformed mounting holes. The cable has multiple cores soldered respectively in the mounting holes to complete the electrical connection. However, mounting the top and bottom casings by screws and individually soldering the cores to the PCB wastes time, increases manufacturing costs and lowers production rate of the mouse.

To overcome the shortcomings, the present invention provides a quick-assembly computer peripheral to mitigate or obviate the aforementioned problems.

SUMMARY OF THE INVENTION

The main objective of the invention is to provide a quick-assembly computer peripheral that has a bottom casing and a top casing quickly attached to the bottom casing to facilitate a semi-automated or fully-automated manufacturing process, lower manufacturing costs and raise production rate of the computer peripheral.

A quick-assembly computer peripheral in accordance with the present invention has a bottom casing, a top casing, a vertical mounting device, an electronic assembly and a vertical positioning device. The vertical mounting device is mounted between the top and bottom casings and combining the top and bottom casings together along a vertical direction. The electronic assembly is mounted between the bottom and top casing and has a PCB and a cable assembly. The vertical positioning device mounted between the top and bottom casings and positioning the electronic assembly along the vertical direction. Because fabrication of the quick-assembly computer peripheral does not require fasteners, such as screws or rivets, fabrication is quick and easy.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
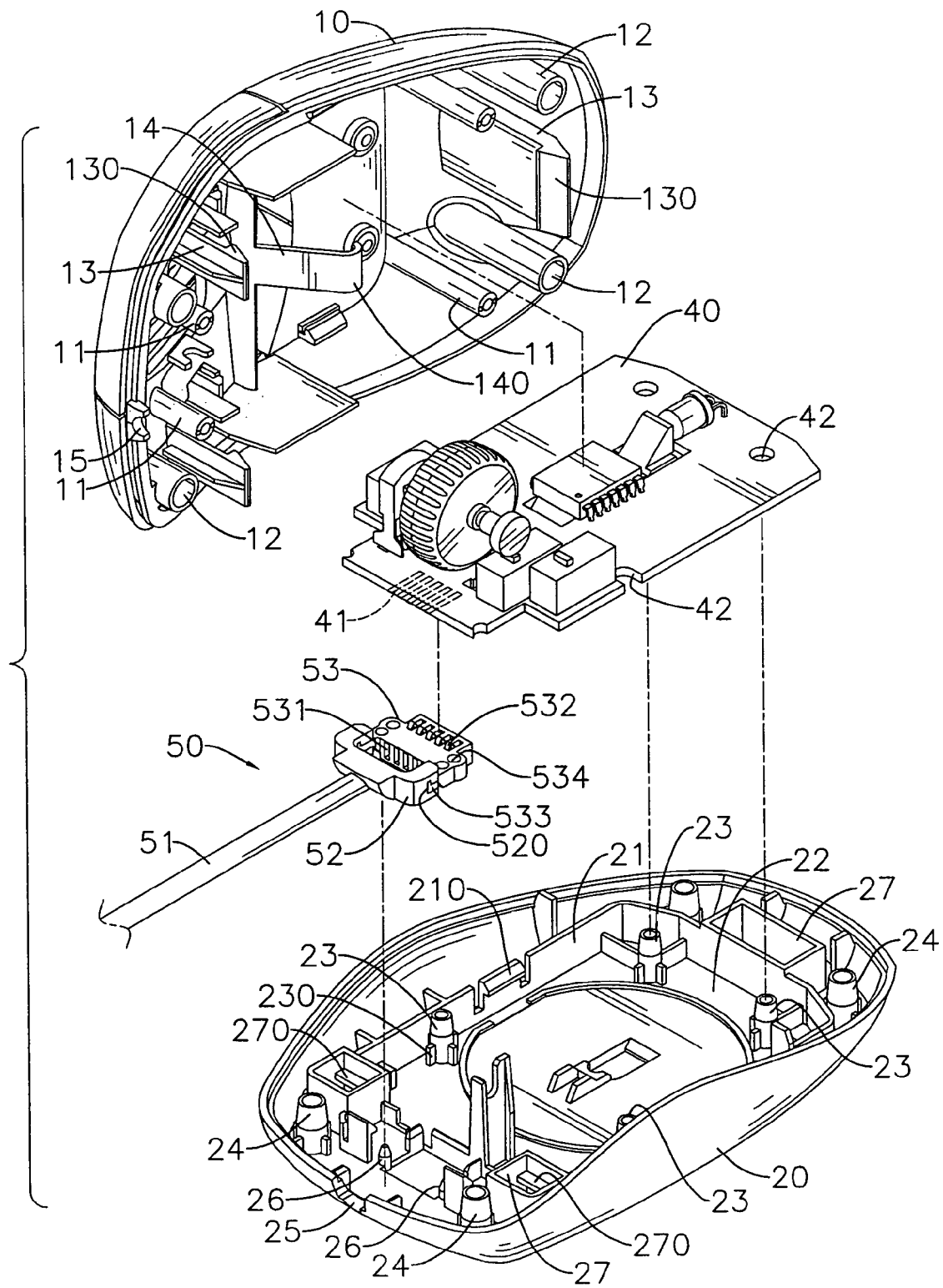
FIG. 1 is an exploded perspective view of a quick-assembly computer peripheral in accordance with the present invention.

The term "computer peripheral" herein includes, but is not limited to, mice, keyboards, trackballs, gamepads, joysticks, card readers, portable storage devices, wireless transmission devices and fingerprint readers. A preferred embodiment of the present invention is a mouse. With reference to FIG. 1, a quick-assembly computer peripheral in accordance with the present invention comprises a top casing (10), a bottom casing (20) and an electronic assembly mounted in the bottom casing (20). The top and bottom casings (10, 20) form a housing. The electronic assembly comprises a printed circuit board (PCB) (40) and a cable assembly (50).

The PCB (40) has an encoding device mounted thereon. The encoding device has a grating or optical encoder and a control circuit. The PCB (40) further has a top surface, a bottom surface, a control circuit, multiple positioning holes (42) and multiple contacts (41). The positioning holes (42) may be circular holes, notches or a mixture thereof and are defined through the PCB (40). The contacts (42) may be copper, gold or other such conductor, are mounted on the bottom surface and connected electrically to the control circuit. The cable assembly (50) has a cable (51), a cable mount (52) mounted on the cable (51) and a connector (53) connected to the cable mount (52).

The cable (51) has an inside end and multiple wires. The cable mount (52) may be U-shaped, is mounted on the inside end of the cable (51) and has two opposite sides and two mounting slots (520). The mounting slots (520) may be L-shaped and are respectively defined in the sides of the cable mount (52).

The connector (53) is mounted on the cable mount (52) and has an inside end, multiple passageways (531), multiple terminals (532), two mounting protrusions (533) and multiple positioning bores (534). The passageways (531) are defined through the connector (53) and each passageway (531) has an inside opening and a top opening. The inside opening is located at the inside end and receives one of the wires. The top opening is located on the top. The terminals (532) are mounted respectively in the passageways (531), are connected respectively to the wires, extend respectively out of the top openings and electrically contact the contacts (41) of the PCB (40) respectively. The mounting protrusions (533) may be L-shaped and are mounted respectively in the slots (520) of the cable mount (52). The positioning bores (534) are defined through the connector (53).

The aforementioned electronic assembly is mounted in the bottom casing (20) and is fastened after the top and bottom casings (10, 20) combine with each other.

Figure 2:
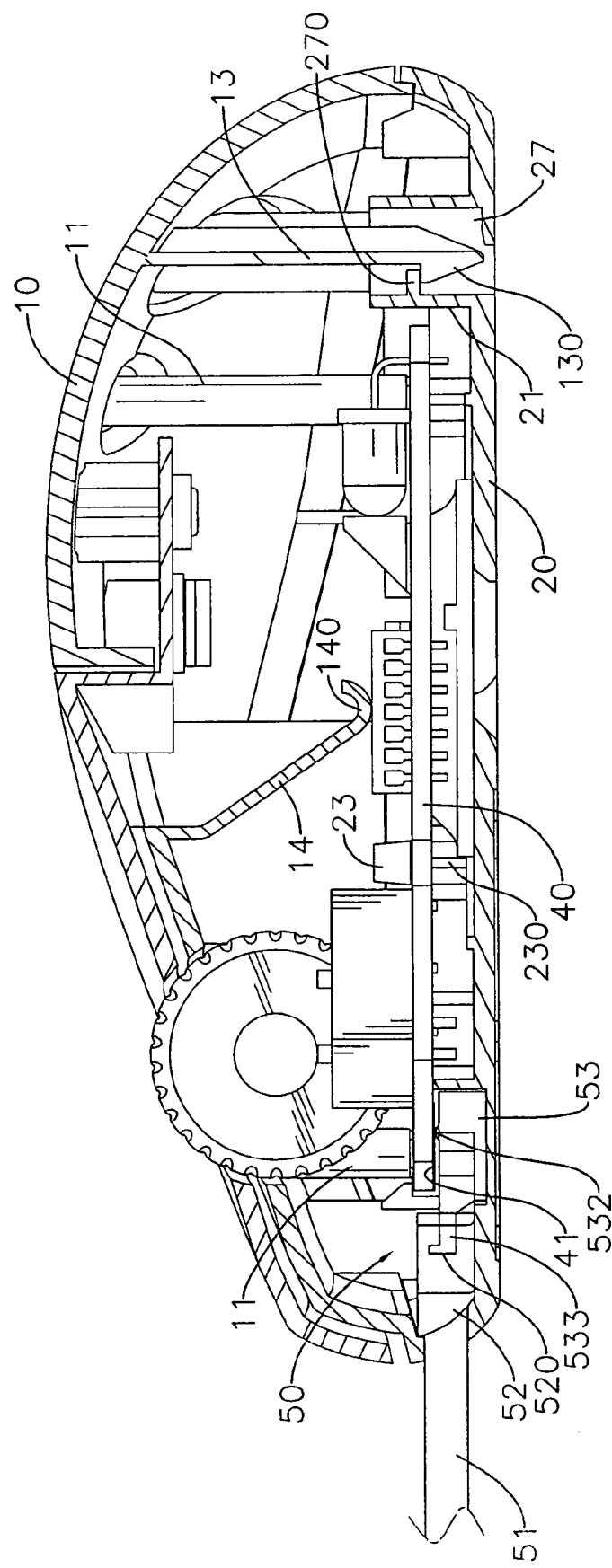
FIG. 2 is a side view in partial section of the quick-assembly computer peripheral in FIG. 1.
Figure 3:
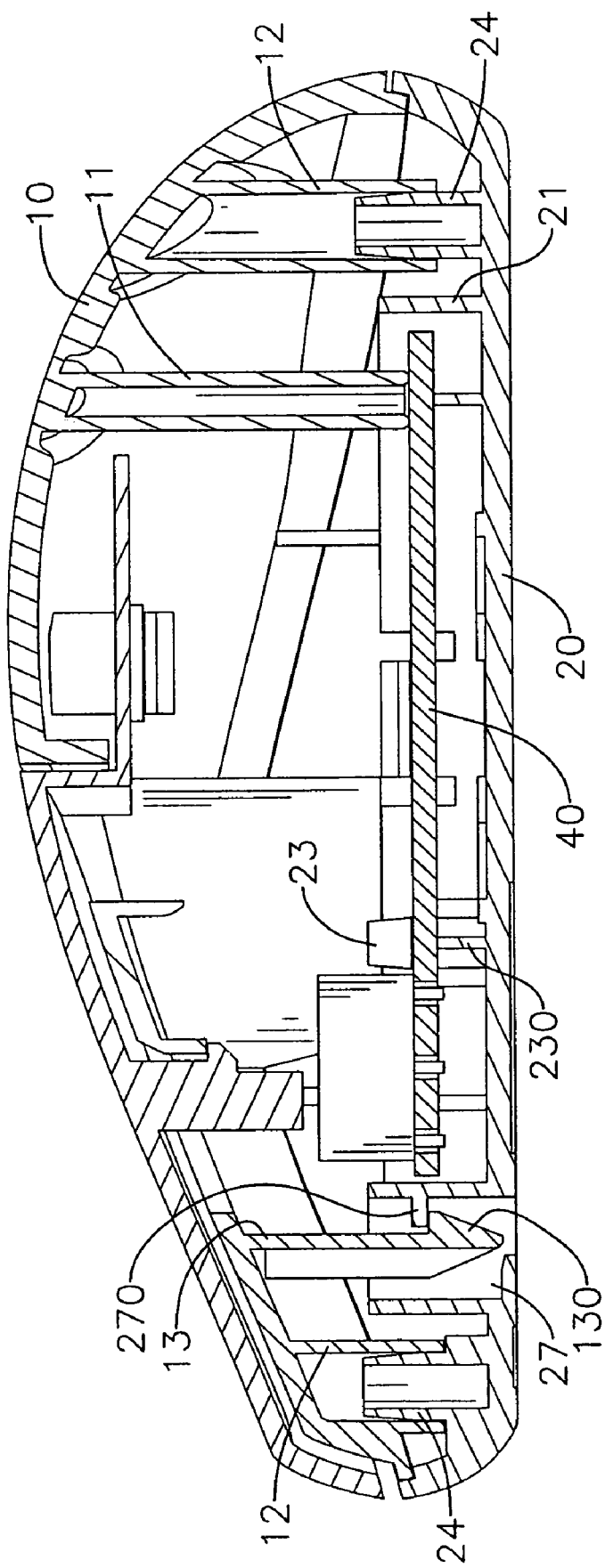
FIG. 3 is another side view in partial section of the quick-assembly computer peripheral in FIG. 1.

With further reference to FIGS. 2 and 3, a vertical mounting device and a vertical positioning device are mounted between the top and bottom casings (10, 20). The vertical mounting device combines the top and bottom casings (10, 20) together along a vertical direction and facilitates semi-automated or fully-automated manufacturing process. The vertical positioning device positions the electronic assembly along the vertical direction after the top and bottom casings (10, 20) combine with each other. The vertical positioning device is described as follows.

With further reference to FIGS. 1 and 2, the bottom casing (20) has a front end, a rear end, an outer bottom surface, an inner bottom surface and an outer rim. The vertical positioning device has an inner sidewall (21), an inner chamber (22), multiple positioning posts (23), multiple hooking tabs (210), multiple positioning bars (11), at least one pressing arm (14) and multiple positioning stumps (26). The inner sidewall (21)

may be rectangular and is formed on and protrudes upwards from the inner bottom surface. The inner chamber (22) is defined in the inner bottom surface, is surrounded by the inner sidewall (21) and accommodates the PCB (40).

The positioning posts (23) are formed on and protrude uprightly from the inner bottom surface and are mounted respectively through the positioning holes (42) of the PCB (40). Each positioning post (23) has a bottom end, a top end and multiple supporting fins (230). The supporting fins (230) are formed on and protrude radially from the positioning post (23) at a distance from the top end and hold the PCB (40) in a specific level. The hooking tabs (210) are resilient, are formed on and protrude laterally from the inner sidewall (21) and hook the PCB (40) to further position the PCB (40).

The top casing (10) is mounted on the bottom casing (20) and has a front end, a mounting side, an outer top surface and an inner top surface. The positioning bars (11) are formed and protrude uprightly from the inner top surface of the top casing (10) and press against the PCB (40) to further position the PCB (40). The at least one pressing arm (14) is resilient and is formed on and protrudes obliquely from the inner top surface. Each of the at least one pressing arm (14) has a distal end and a pressing member (140). The pressing member (140) is blunt and arrowheaded and may be curved so not capable of damaging. Furthermore, the pressing member (140) is formed on the distal end and presses against the PCB (40) to further position and prevent the PCB (40) from vertical displacement.

The bottom casing (20) further has a cable notch (25) defined through the front end thereof. The positioning stumps (26) are formed on and protrude uprightly from the inner bottom surface near the cable notch (25) and are mounted respectively through the positioning bores (534) of the cable (53) of the cable assembly (50) to fasten the connector (53) on the bottom casing (20). Thus, the cable (51) extends out through the cable notch (25). The top casing (10) further has a cable guide (15). The cable guide (15) is U-shaped, is formed on the front end of the top casing (10), corresponds and combines with the cable notch (15) of the bottom casing (20) to form a cable hole mounted around the cable (51).

The vertical mounting device between the top and bottom casings (10, 20) are described as follows.

With reference to FIGS. 1 and 3, the vertical mounting device comprises multiple mounting posts (24), multiple vertical mounts, multiple mounting sleeves (12) and multiple mounting hooks (13). The mounting posts (24) are formed on and protrude uprightly from the inner bottom surface adjacent to the outer rim of the bottom casing (20) and may be tapered. In a preferred embodiment, the mounting posts (24) are disposed respectively on corners of the bottom casing (20) to fasten on the top casing (10).

The vertical mounts are formed on and protrude uprightly from the inner bottom surface of the bottom casing (20) and each vertical mount has a mounting recess (27) and a hooking element (270). The mounting recess (27) is defined in the vertical mount and has an inner surface. The hooking element (270) is formed on and protrudes laterally from the inner surface of the mounting recess (27) to fasten on the top casing (10). In a preferred embodiment, three vertical mounts are implemented. One vertical mount is disposed near the mounting side of the bottom casing. The other two vertical mounts are disposed near the front end of the bottom casing.

The mounting sleeves (12) are tubular, are formed on and protrude uprightly from the inner top surface and are mounted respectively around the mounting posts (24) of the bottom casing (20). The mounting hooks (13) are resilient, are formed on and protrude uprightly from the inner top surface of the top casing (10), correspond to and are mounted respectively in the mounting recesses (27) of the bottom casing (20) and each mounting hook (13) has a distal end and a hooking portion (130). The hooking portion (130) is formed on the distal end and hooks the hooking element (270) in a corresponding mounting recess (27).

In a preferred embodiment, three mounting hooks (13) are implemented. One mounting hook (13) is located near the mounting side of the top casing (10) with the hooking portion (130) protruding forwards. The other two mounting hooks (13) are located near the front end of the top casing (10) with the hooking portions (130) protruding backwards. The fabrications of the present invention are described as follows.

Figure 4:
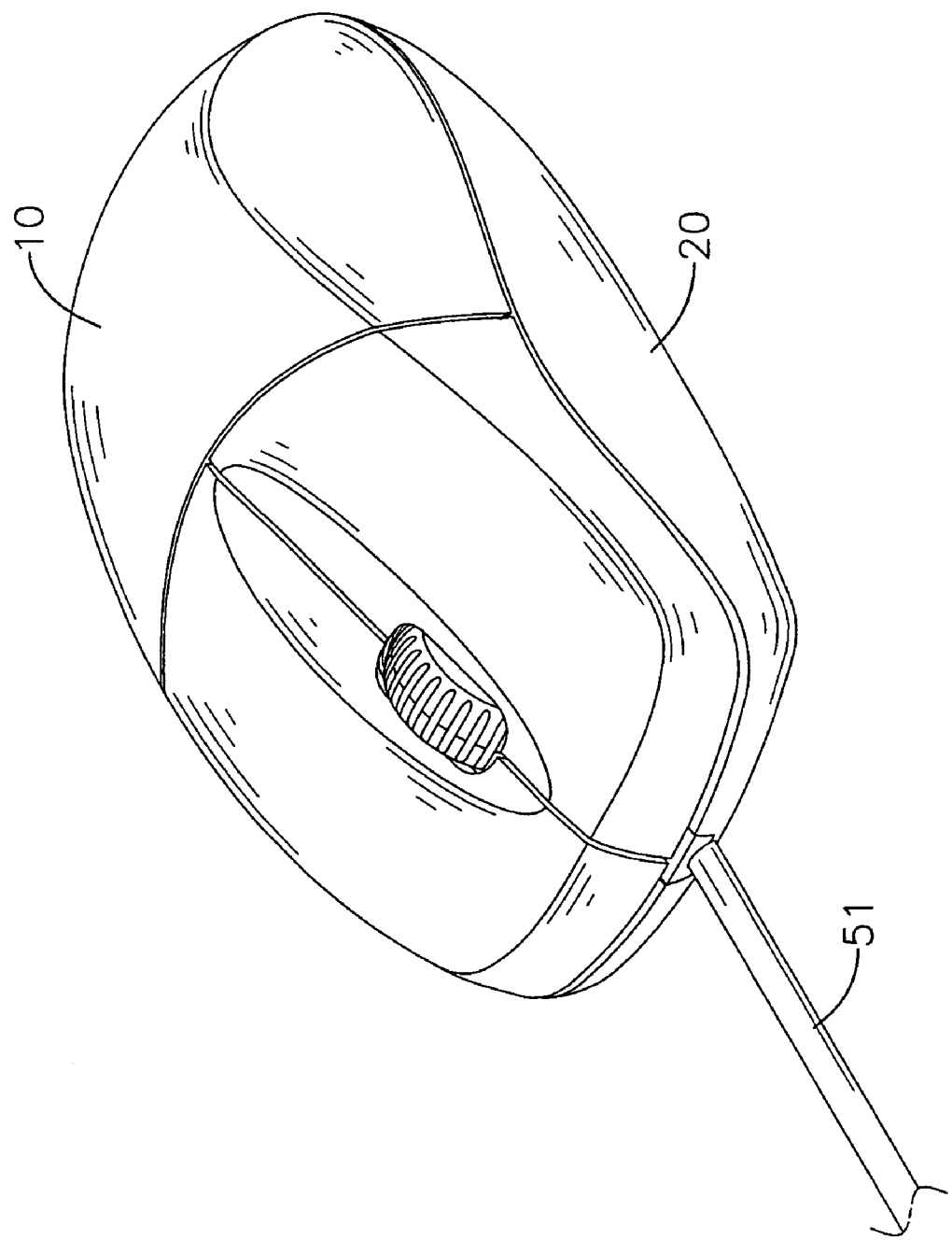
FIG. 4 is a perspective view of the quick-assembly computer peripheral in FIG. 1.

To fabricate the quick-assembly computer peripheral, the connector (53) is mounted on the positioning stumps (26) of the bottom casing (20) with the cable (51) mounted in the cable notch (25). Then the PCB (51) is mounted in the inner chamber (22) and mounted around the positioning posts (23). The contacts (41) of the PCB (40) electrically contact the terminals (532) of the connector (53). Subsequently, the top casing (10) is mounted vertically on the bottom casing (10). As the mounting sleeves (12) are engaged with the mounting posts (24), the mounting hooks (13) are simultaneously engaged with the hooking elements (270) of the mounting recesses (27) of vertical mounts and the pressing arm (14) and the positioning bars (11) tightly press against the PCB (40) to complete fabrication, as shown in FIG. 4.

Because fabrication of the quick-assembly computer peripheral does not require fasteners such as screws or rivets, fabrication is easy and quick. Furthermore, the top casing (10) is mounted on the bottom casing (20) in a single step by the hooking portions (130) and hooking elements (270) snapping together without a precise screwing or riveting process so precision requirements of fabricating machines is lowered. Therefore, the quick-assembly computer peripheral has lower manufacturing costs and increased production rate.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A quick-assembly computer peripheral comprising:
   a bottom casing having a front end, a rear end, an inner bottom surface, an outer rim and an inner chamber defined in the inner bottom surface;
   a top casing mounted on the bottom casing and having a front end, a rear end and an inner top surface;
   a vertical mounting device mounted between the top and bottom casings and combining the top and bottom casings together along a vertical direction; and
   an electronic assembly mounted between the bottom and top casing and having
      a PCB mounted in the inner chamber and having multiple contacts; and
      a cable assembly connected to the PCB and having multiple terminals electrically contacting the contacts respectively; and
   a vertical positioning device mounted between the top and bottom casings and positioning the electronic assembly along the vertical direction.

2. The quick-assembly computer peripheral as claimed in claim 1, wherein
the PCB has
a top surface;
a bottom surface; and
multiple positioning holes; and
the vertical positioning device has
an inner sidewall formed on and protruding from the inner bottom surface of the bottom casing and surrounding the inner chamber;
multiple positioning posts mounted formed on and protruding uprightly from the inner bottom surface of the bottom casing and mounted respectively through the positioning holes of the PCB; and
multiple positioning bars formed on and protruding uprightly from the inner top surface of the top casing and pressing against the PCB.

3. The quick-assembly computer peripheral as claimed in claim 2, wherein the vertical positioning device further has at least one pressing arm formed on and protruding obliquely from the inner top surface of the top casing and pressing against the PCB.

4. The quick-assembly computer peripheral as claimed in claim 3, wherein each positioning post has a top end and multiple supporting fins formed on and protruding radially from the positioning post at a distance from the top end and holding the PCB.

5. The quick-assembly computer peripheral as claimed in claim 4, wherein
the cable assembly has
a cable having an inside end;
a cable mount mounted on the inside end of the cable; and
a connector, on which the terminals of the cable assembly are mounted, the connector mounted on the cable mount and having multiple positioning bores defined through the connector;
the bottom casing further has a cable notch defined through the front end of the bottom casing;
the vertical positioning device further has multiple positioning stumps formed on and protruding uprightly from the inner bottom surface and mounted respectively through the positioning bores of the connector; and
the top casing has a cable guide being U-shaped, formed on the front end of the top casing and combining with the cable notch to form a cable hole holding the cable.

6. The quick-assembly computer peripheral as claimed in claim 5, wherein the vertical mounting device has
multiple vertical mounts formed on and protruding uprightly from the inner bottom surface of the bottom casing and each vertical mount having
a mounting recess defined in the vertical mount and having an inner surface; and
a hooking element formed on and protruding laterally from inner surface; and
multiple mounting posts formed on and protruding uprightly from the inner bottom surface; and
multiple mounting sleeves being tubular, formed on and protruding uprightly from the inner top surface of the top casing and mounted respectively around the mounting posts of the bottom casing; and
multiple mounting hooks formed on and protruding uprightly from the inner top surface of the top casing, corresponding to and mounted respectively in the mounting recesses of the bottom casing and each mounting hook having a distal end and a hooking portion formed on the distal end and hooking the hooking element in a corresponding mounting recess.

7. The quick-assembly computer peripheral as claimed in claim 6, wherein three vertical mounts are implemented, one vertical mount is disposed near the rear end of the bottom casing and the other two vertical mounts are disposed near the front end of the bottom casing; and
three mounting hooks are implemented, one mounting hook is disposed near the rear end of the top casing with the hooking portion protruding forwards and the other two mounting hooks are located near the front end of the top casing with the hooking portions protruding backwards.

8. The quick-assembly computer peripheral as claimed in claim 6, wherein the mounting posts are disposed respectively on corners of the bottom casing.

9. The quick-assembly computer peripheral as claimed in claim 6, wherein each of the at least one pressing arm having a distal end and a pressing member being blunt and arrow-headed and formed on the distal end.

10. A quick-assembly computer peripheral comprising
a housing accommodating a PCB and the PCB having multiple contacts;
a cable assembly mounted between the top and bottom casings and having multiple terminals; wherein
the housing has a top casing and a bottom casing and having multiple mounting hooks, multiple mounting recesses engaged respectively with the mounting hooks, multiple positioning bars and multiple positioning posts to mount and position the PCB and cable assembly between the top and bottom casings, wherein the terminals electrically contact the contacts respectively.

* * * * *